April 10, 1934.  H. A. SAUER  1,954,328
LIGHT-TIGHT FILM MAGAZINE
Filed Aug. 1, 1931
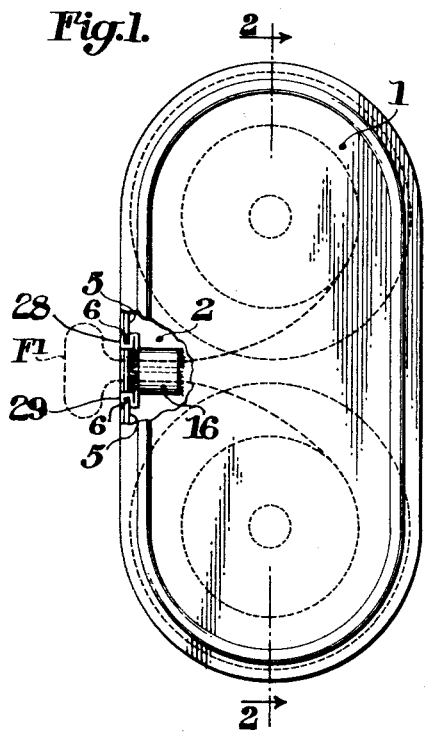
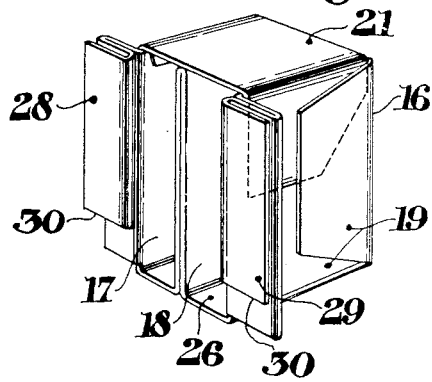
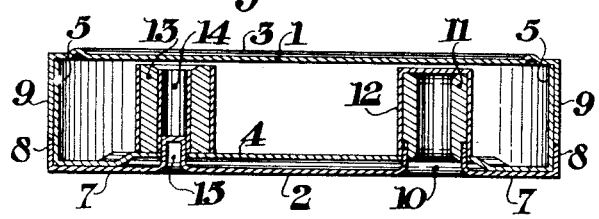
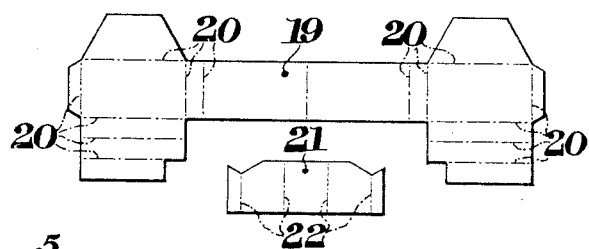
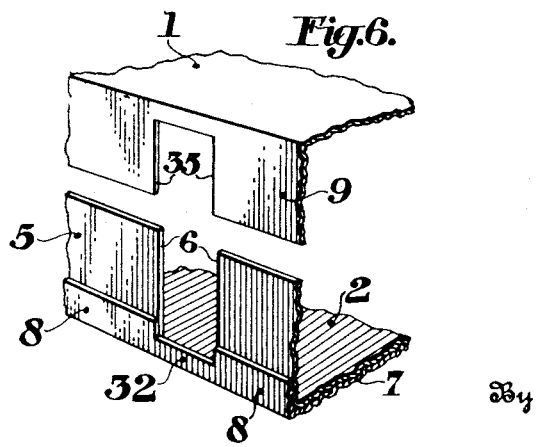
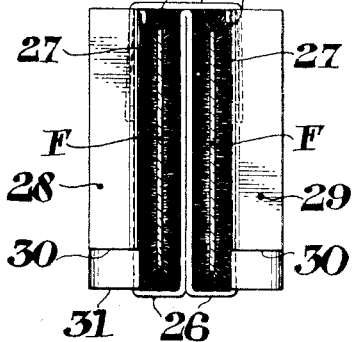
Inventor:
Howard A. Sauer,
By
Attorneys Patented Apr. 10, 1934

1,954,328

UNITED STATES PATENT OFFICE 1,954,328

LIGHT-TIGHT FILM MAGAZINE

Howard A. Sauer, Rochester, N. Y., assignor to Eastman Kodak Company, Rochester, N. Y., a corporation of New York Application August 1, 1931, Serial No. 554,454

5 Claims. (Cl. 242—71)

This invention relates to photography and more particularly to photographic film magazines having a light-tight entrance and exit for the film. One object of my invention is to provide a magazine in which a single light trap is used through which the film may pass in two directions to and from coils of film supported in the magazine. Another object of my invention is to provide a magazine wall with a slot in which a light-tight film passage is provided, the light-tight passage being carried totally by the walls of the slotted magazine. Another object of my invention is to provide a film magazine with a pair of reels on which the light-tight channel is slidably mounted and to provide a two-part magazine so that one part may support the light channel and the other part may hold the light channel in place and other objects will appear in the following specification, the novel features being particularly pointed out in the claims at the end thereof.

Coming now to the drawing wherein like reference characters denote like parts throughout:

Fig. 1 is a plan view partially in section showing a magazine constructed in accordance with and embodying a preferred form of my invention;

Fig. 2 is a section through line 2—2 of Fig. 1;

Fig. 3 is a perspective view of a light channel adapted to be supported by a magazine wall;

Fig. 4 is a plan view of two blanks before being folded to form the light channel;

Fig. 5 is an end elevation of the light channel shown in Fig. 3; and

Fig. 6 is an elevated fragmentary perspective view of portions of the magazine sections.

In a preferred form of my invention I prefer to construct the film magazine of two telescoping parts 1 and 2 which may be suitably embossed at 3 and 4 to strengthen the parts and to facilitate guiding the convolutions of film in their proper place during the winding and rewinding operations.

Part 2 of the film magazine is preferably made of two pieces of metal, one piece being of elongated shape having rounded ends and having an upstanding flange 5 extending around the magazine section and terminating in spaced edges 6 which are preferably parallel and as best shown in Fig. 6 form tracks upon which the light channel may slide into an operative position in which it may be held by the second magazine section 1.

Magazine section 2 may also include a second plate 7 terminating in a short flange 8 which forms an abutment against which the flange 9 of section 1 contacts when the magazine has been completely assembled.

Magazine section 2 includes an opening 10 through which a suitable driving mechanism may pass to turn a hub 11 against which one end of the film is fastened by means of a thimble like device 12 which forms no part of the present invention. Hub 11 supports the take-up roll upon which the exposed film is wound. The supply reel consists of a hub 13 having a central operture 14 adapted to revolve freely upon the post 15 which may be conveniently formed up out of the metal of the magazine section 2.

The flange construction above described in which the flange 9 telescopes over flange 5 and fits against the ends of flange 8 forms a light-tight connection.

In order to prevent light from entering the magazine at the point where the film passes in and out, I prefer to form a light channel as indicated broadly at 16 in Fig. 3, this light channel being provided with openings 17 and 18 which are parallel but which are spaced apart.

To make this light channel I use blanks of the shape shown in Fig. 4, blank 19 being folded along the dot and dash lines 20 into the shape shown in Fig. 3 and blank 21 being folded along the dot and dash lines 22 into the shape shown in Fig. 3 wherein member 21 is shown as being a clip over the top of passages 17 and 18 and which is spaced from walls 26 of the light trap to form an opposing wall. I preferably render the passages 17 and 18 light-tight by means of plush or other pile material 27 although this material permits film F to pass freely through these passage-ways.

In order to locate and properly support the film channels 17 and 18 in the magazine I provide complementary grooved members 28 and 29 on each side of the openings. These grooved members are parallel and are of a width to exactly engage the parallel edges 6 of the magazine section 2 and as best shown in Fig. 5 terminate at 30 a short distance from the end 31 of the channels, this distance being substantially the same as the width of the flange 32 indicated in Fig. 6. Thus when the grooved members 28 and 29 of the light-tight channel member are engaged with and slid upon the parallel edges 6, the channel member is supported rigidly in its proper location and a light-tight connection is made between the edges of the channel member and the edges of the film magazine section 2.

Magazine section 1 as also shown in Fig. 6 is provided with a slot formed between the walls 35 so that when the two magazine sections are placed together as indicated in Fig. 2 the light-tight channel member will be retained against sliding on the edges 6 by means of the magazine section 1.

In use the magazine is supplied with film F and a loop of film is drawn out as indicated at F¹ in Fig. 1 passing through the magazine twice, once through channel 17 and once through channel 18 leading to and from the take-up and supply rolls of film in the magazine. The two sections may be fixed together by any suitable form of clamp or by adhesive tape and the user merely exposes the film and returns it to a processing station for developing. The magazine sections are not open until the film is to be removed at which time it is a simple matter to slide out the light-tight channel member 16 and replace it with a new one before again filling the magazine with unexposed film if this should be necessary.

Having thus described my invention, what I claim as new and desire to secure by Letters Patent is:

1. A light trap for film magazines including a film container, a pair of parallel edges carried by spaced walls on the film container, a light channel adapted to be held between the spaced walls, and channel shaped walls carried by the light channel adapted to engage and embrace the parallel edges of the spaced walls of the film container whereby the light channel may be solely supported thereby.

2. A light trap for film magazines including a film container, a pair of parallel edges carried by spaced walls on the film container, a light channel adapted to be held by said spaced wall edges comprising a pair of grooves complementary in shape to the spaced wall edges and adapted to engage both sides of and be positioned by the spaced wall edges, said light channel having a pile fabric normally obstructing said channel but permitting film to pass therethrough.

3. A light trap for film magazines including a film container, a pair of parallel edges carried by spaced walls on the film container, said container having a top and side walls, a light channel adapted to be held by said parallel edge spaced walls comprising a pair of grooves complementary in shape to the parallel edge spaced walls and having a sliding engagement therewith, and a light retarding material in the light retarding channel.

4. In a two part magazine the combination with one part comprising a flanged receptacle with a slot in the flange, the sides of said slot forming a pair of spaced edges on the walls, of a light-tight channel including spaced complementary members adapted to engage the parallel spaced edges of the walls to slide thereon for supporting the light-tight channel relative thereto, the other part of the two part magazine being adapted to fit the first mentioned part and to hold the channel member in a fixed position on the spaced edges on the walls.

5. A light trap for magazines including a film container, a pair of parallel edges on spaced walls on the film container having top and side walls, a light-tight channel member adapted to be totally supported by said spaced edges and comprising a pair of grooves complementary in shape to the spaced edges, said grooves having walls engaging the tops and side walls of the spaced edges, and means included in the container for holding the light-tight channel on the edges.

HOWARD A. SAUER.